United States Patent
Sakaguchi

(10) Patent No.: US 10,386,598 B2
(45) Date of Patent: Aug. 20, 2019

(54) SIGNAL PROCESSING DEVICE AND METHOD FOR CONTROLLING THE SAME

(71) Applicant: CANON KABUSHIKI KAISHA, Tokyo (JP)

(72) Inventor: Takeshi Sakaguchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 15/638,185

(22) Filed: Jun. 29, 2017

(65) Prior Publication Data

US 2018/0017759 A1    Jan. 18, 2018

(30) Foreign Application Priority Data

Jul. 15, 2016 (JP) .................................. 2016-140645

(51) Int. Cl.
*G02B 7/38* (2006.01)
*H04N 5/232* (2006.01)
*G02B 7/34* (2006.01)

(52) U.S. Cl.
CPC ................. *G02B 7/38* (2013.01); *G02B 7/34* (2013.01); *H04N 5/23212* (2013.01); *H04N 5/23287* (2013.01)

(58) Field of Classification Search
CPC ........ G02B 7/34; G02B 7/38; H04N 5/23212; H04N 5/23287
See application file for complete search history.

(56) References Cited

U.S. PATENT DOCUMENTS

| | | | | |
|---|---|---|---|---|
| 2008/0112643 | A1* | 5/2008 | Kusaka | G03B 13/32 382/278 |
| 2011/0134310 | A1* | 6/2011 | Kimura | G02B 7/28 348/345 |
| 2014/0211059 | A1* | 7/2014 | Aoki | G02B 7/34 348/311 |
| 2014/0267843 | A1* | 9/2014 | Sakaguchi | H04N 5/23212 348/262 |
| 2014/0293119 | A1* | 10/2014 | Hamano | H04N 5/23212 348/350 |
| 2014/0320711 | A1* | 10/2014 | Fukuda | H04N 5/23212 348/294 |
| 2015/0085178 | A1* | 3/2015 | Aoki | H04N 5/23212 348/349 |
| 2016/0327771 | A1* | 11/2016 | Inoue | G02B 7/34 |

FOREIGN PATENT DOCUMENTS

| | | |
|---|---|---|
| JP | 2006-301150 A | 11/2006 |
| JP | 2009-217252 A | 9/2009 |

* cited by examiner

*Primary Examiner* — Yubin Hung
(74) *Attorney, Agent, or Firm* — Canon U.S.A., Inc. I.P. Division

(57) ABSTRACT

At least one focus detection signal processing unit calculates a first correlation amount obtained by comparing a pair of image signals with each other in a same direction on a time axis and a second correlation amount obtained by comparing the pair of image signals with each other in opposite directions on the time axis, the pair of image signals being output from an image sensor and respectively corresponding to a pair of light beams that have each passed through a corresponding one of areas, in an exit pupil of an imaging optical system, that are at least partially different from each other. A camera control unit determines whether an image shift amount corresponding to the first correlation amount corresponds to an in-focus position, based on the first correlation amount and the second correlation amount.

24 Claims, 9 Drawing Sheets

SIGNAL PROCESSING DEVICE AND METHOD FOR CONTROLLING THE SAME

BACKGROUND OF THE INVENTION

Field of the Invention

The present disclosure relates to at least one embodiment of a signal processing device that has a focus detection function and to a method for controlling the same.

Description of the Related Art

A phase-difference detection method is generally known as a focus detection method employed in image capturing apparatuses. In the phase-difference detection method, an image sensor outputs a pair of image signals that respectively correspond to a pair of light beams having respectively passed through areas, in an exit pupil of an imaging optical system, that are at least partially different from each other, and an image shift amount is detected based on the pair of image signals. Then, a defocus amount is obtained based on the image shift amount.

In this regard, when the image shift amount is detected for a periodic pattern, such as stripes, in an out-of-focus state, the image shift amount may be erroneously detected with the phase-difference detection method, i.e., an image shift amount not corresponding to an in-focus position may be detected as the amount corresponding to the in-focus position. Thus, focusing based on a defocus amount obtained based on the erroneously detected image shift amount results in a failure. The erroneous detection of the image shift amount not corresponding to the in-focus position as the amount corresponding to the in-focus position is generally referred to as false focusing.

In view of the above, Japanese Patent Application Laid-Open No. 2006-301150 discusses a technique whereby whether a subject is a periodic pattern is determined and when the subject is determined to be a periodic pattern, the focus detection is not performed with the phase-difference detection method so as to prevent the false focusing.

However, while the technique discussed in Japanese Patent Application Laid-Open No. 2006-301150 can prevent the false focusing as a result of the detection with the phase-difference detection method when the subject is determined to be a periodic pattern, the technique has room for improvement to be effective for a largely out-of-focus state as described below. More specifically, in the largely out-of-focus state where an image is blurred or collapsed, the determination of whether the subject is a periodic pattern becomes difficult. As a result, a periodic pattern leading to the false focusing may be determined not to be a periodic pattern. When the periodic pattern leading to the false focusing is erroneously determined not to be a periodic pattern, the detection with the phase-difference detection method may result in the false focusing.

SUMMARY OF THE INVENTION

The present disclosure is directed to at least one embodiment of a signal processing device capable of determining whether false focusing on a periodic pattern occurs, even in a largely out-of-focus state, and to a method for controlling the same.

According to an aspect of the present disclosure, at least one embodiment of a signal processing device includes a correlation amount calculation unit configured to calculate a first correlation amount obtained by comparing a pair of image signals with each other in a same direction on a time axis and a second correlation amount obtained by comparing the pair of image signals with each other in opposite directions on the time axis, the pair of image signals being output from an image sensor and respectively corresponding to a pair of light beams that have each passed through a corresponding one of areas, in an exit pupil of an imaging optical system, that are at least partially different from each other, and a determination unit configured to determine whether an image shift amount corresponding to the first correlation amount corresponds to an in-focus position, based on the first correlation amount and the second correlation amount.

According to another aspect of the present disclosure, at least one embodiment of a signal processing device includes a correlation amount calculation unit configured to calculate a second correlation amount obtained by comparing a pair of image signals with each other in opposite directions on a time axis, the pair of image signals being output from an image sensor and respectively corresponding to a pair of light beams that have each passed through a corresponding one of areas, in an exit pupil of an imaging optical system, that are at least partially different from each other, and a determination unit configured to determine whether an image shift amount based on the pair of image signals corresponds to an in-focus position, based on the second correlation amount, wherein the determination unit is configured to determine that the image shift amount based on the pair of image signals does not correspond to the in-focus position in a case where the second correlation amount is equal to or larger than a predetermined value.

According to yet another aspect of the present disclosure, at least one embodiment of a signal processing device includes a correlation amount calculation unit configured to calculate a first correlation amount indicating a level of similarity of a pair of image signals and a second correlation amount indicating a level of similarity of the pair of image signals calculated with one of the pair of image signals inverted in a direction in which an image shift amount is detected, the pair of image signals being output from an image sensor and respectively corresponding to a pair of light beams that have each passed through a corresponding one of areas, in an exit pupil of an imaging optical system, that are at least partially different from each other, wherein different signals are output in accordance with a ratio of the second correlation amount to the first correlation amount.

According to other aspects of the present disclosure, one or more additional signal processing devices, one or more methods for controlling same, and one or more storage mediums for use therewith are discussed herein. Further features of the present disclosure will become apparent from the following description of exemplary embodiments with reference to the attached drawings.

DESCRIPTION OF THE EMBODIMENTS

Figure 1:
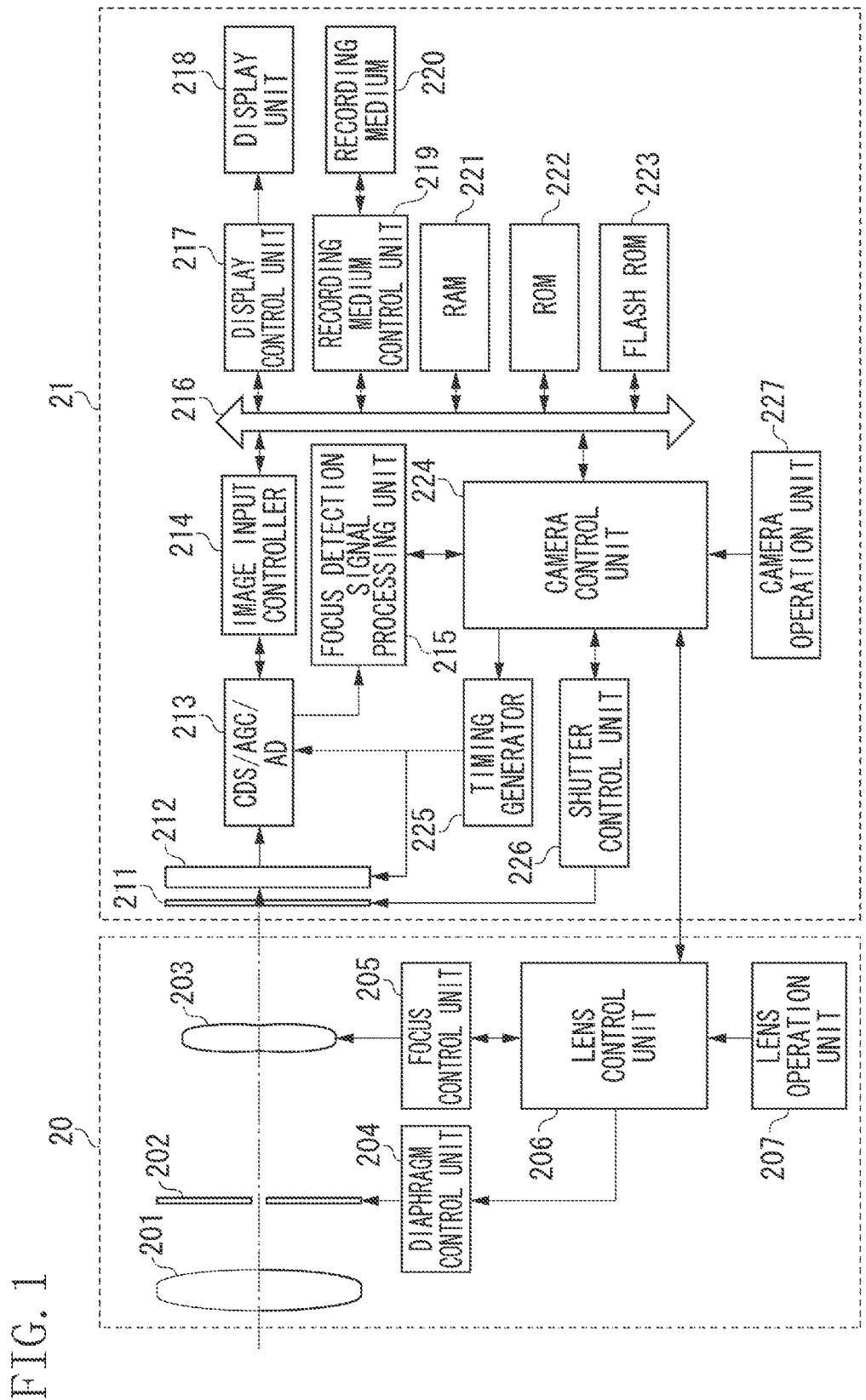
FIG. 1 is a block diagram illustrating an embodiment of an image capturing apparatus.

Exemplary embodiments of the present disclosure are described below with reference to the attached drawings. FIG. 1 is a block diagram illustrating a configuration of a lens and a configuration of an interchangeable-lens camera main body according to an exemplary embodiment. An interchangeable-lens camera is described as an example in the present exemplary embodiment but a lens-integrated camera may be employed instead of the interchangeable-lens camera.

[Configuration of Image Capturing Apparatus]

As illustrated in FIG. 1, an image capturing apparatus according to the present exemplary embodiment includes a lens 20 and a camera main body 21.

The lens 20 includes a lens control unit 206 that integrally controls entire operations of the lens 20. The camera main body 21 includes a camera control unit 224 that integrally controls entire operations of the camera main body 21. The camera control unit 224 includes a signal processor such as a central processing unit (CPU). The camera control unit 224 and the lens control unit 206 can communicate with each other. When the image capturing apparatus is a lens-integrated camera, the camera control unit 224 may be in charge of all of the functions and processes of the lens control unit 206. In this configuration, the camera control unit 224 integrally controls entire operations of the image capturing apparatus that is the lens-integrated camera.

First, a configuration of the lens 20 is described. The lens 20 includes a fixed lens 201, a diaphragm 202, a focus lens 203, a diaphragm control unit 204, a focus control unit 205, the lens control unit 206, and a lens operation unit 207. In the present exemplary embodiment, the fixed lens 201, the diaphragm 202, and the focus lens 203 form an imaging optical system. The fixed lens 201 is a fixed first lens group disposed closest to a subject in the lens 20. The diaphragm 202 is driven by the diaphragm control unit 204 to control a quantity of light incident on an image sensor 212 described below. The focus lens 203 is disposed closest to an imaging plane in the lens 20, and is driven by the focus control unit 205 in an optical axis direction to adjust the position of focus point to the image sensor 212 described below. The lens control unit 206 performs control in such a manner that the diaphragm control unit 204 determines an opening area amount of the diaphragm 202 and the focus control unit 205 determines the position of the focus lens 203 in the optical axis direction. When a user performs an operation on the lens operation unit 207, the lens control unit 206 performs control in accordance with the user operation. The lens control unit 206 controls the diaphragm control unit 204 and the focus control unit 205 in accordance with a control command or control information from the camera control unit 224 described below. The lens control unit 206 transmits lens control information (optical information) to the camera control unit 224.

Next, a configuration of the camera main body 21 is described. The camera main body 21 has the following configuration units so that an image signal can be acquired from a light beam having passed through the imaging optical system. Specifically, the camera main body 21 includes a shutter 211, the image sensor 212, a correlated double sampling (CDS)/automatic gain control (AGC)/analog-to-digital (AD) converter 213, an image input controller 214, the camera control unit 224, a timing generator 225, a shutter control unit 226, a focus detection signal processing unit 215, a bus 216, a display control unit 217, a display unit 218, a recording medium control unit 219, a recording medium 220, a random access memory (RAM) 221, a read only memory (ROM) 222, a flash ROM 223, and a camera operation unit 227.

The camera control unit 224 controls the shutter 211 to adjust exposure time for the image sensor 212 described below. The image sensor 212 is a photoelectric conversion element (photodiodes PD) including a charged coupled device (CCD) sensor or a complementary metal oxide semiconductor (CMOS) sensor. The light beam (subject image) that has passed through the imaging optical system of the lens 20 is focused on a light receiving surface of the image sensor 212, and is converted by each photodiode PD (photoelectric conversion unit) into a signal load corresponding to the quantity of incident light. The signal loads accumulated in the photodiodes are sequentially read from the image sensor 212 based on a driving pulse issued from the timing generator 225 in response to an instruction from the camera control unit 224. Thus, voltage signals (image signals and focus detection signals) corresponding to the signal loads are obtained.

Figure 2B:
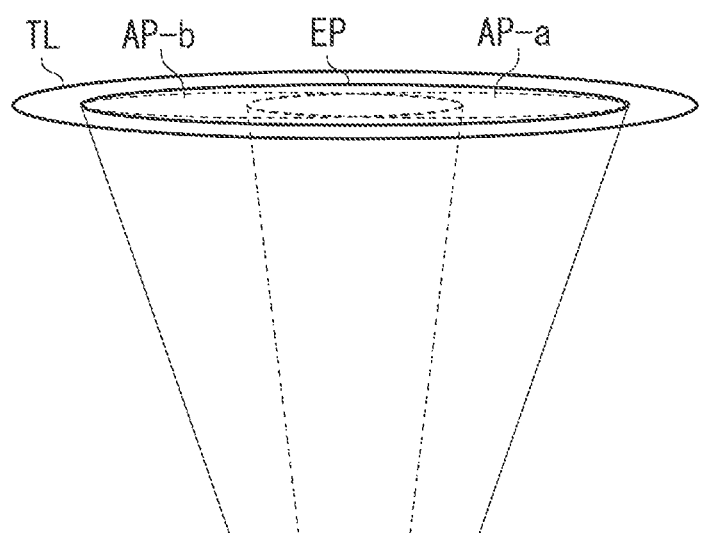
FIGS. 2A and 2B are each a schematic view illustrating an embodiment of an imaging plane phase-difference detection method.

In the present exemplary embodiment, the image sensor 212 has each pixel section including two photodiodes PD as illustrated in FIG. 2B to perform focus detection with an imaging plane phase-difference detection method. A light beam that has passed through an entire area of an exit pupil EP of an imaging optical system TL is split by a micro lens ML to be focused on the two photodiodes PD, whereby two types of signals, i.e., an image signal and a focus detection signal can be acquired. More specifically, two image signals A and B for focus detection (focus detection signals) are respectively obtained from the two photodiodes PD, and the two signals A and B are added to each other to be a signal A+B as the image signal.

Figure 2A:
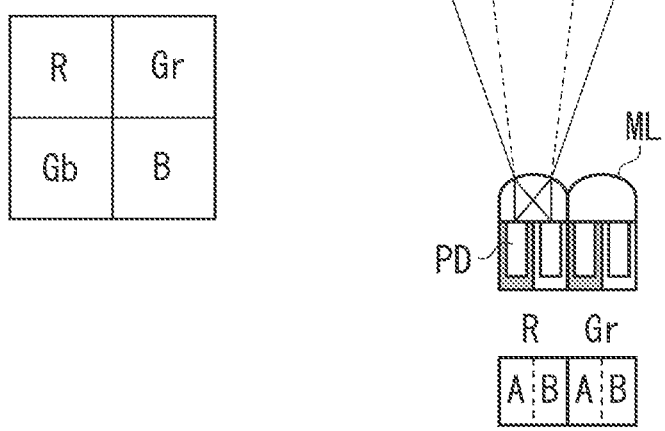

One of the two photodiodes PD illustrated in FIG. 2B performs photoelectrical conversion on a light beam that has passed through a pupil area AP-a (a right side elliptical area illustrated with a dotted line in the exit pupil EP). The other of the two photodiodes PD performs photoelectrical conversion on a light beam that has passed through a pupil area AP-b (a left side elliptical area illustrated with a dotted line in the exit pupil EP). Both of the pupil area AP-a (first pupil area) and the pupil area AP-b (second pupil area) are areas included in the exit pupil EP and the pupil area AP-a (first pupil area) and the pupil area AP-b (second pupil area) overlap each other. One (first photoelectric conversion unit) of the two photodiodes PD and the other (second photoelectric conversion unit) of the two photodiodes PD respectively receive light beams each passing through a corresponding one of pupil areas, in the exit pupil EP, at least partially different from (not overlapping) each other. More specifically, a plurality of pixel sections each including the first photoelectric conversion unit and the second photoelectric conversion unit that respectively perform photoelectric conversion on a pair of light beams that have each passed through a corresponding one of pupil areas, in the exit pupil EP of the imaging optical system, at least partially different from (not overlapping) each other is two dimensionally arranged on the image sensor 212. With this configuration, focus detection can be achieved over the entire imaging surface. In the present exemplary embodiment, the focus detection corresponds to detection of an image shift amount. The focus detection signal processing unit 215 performs correlation calculation for two (a pair of) image signals based on the focus detection signals as described below, whereby an image shift amount and various types of information related to reliability are calculated. FIG. 2A is an enlarged view illustrating the pixel sections of a part of the image sensor 212 according to the present exemplary embodiment. As illustrated in FIG. 2A, a pixel arrangement known as a primary color Bayer pattern is employed. More specifically, a two dimensional single plate CMOS color image sensor in which red (R), green (G), and blue (B) primary color filters are arranged in the Bayer pattern is employed. In FIG. 2A, R represents an R pixel, B represents a B pixel, and Gr and Gb represent G pixels.

The image signal and the focus detection signal, read from the image sensor 212, are input to the CDS/AGC/AD converter 213 that performs correlated double sampling for removing reset noise and gain control, and converts the signals into digital signals. The CDS/AGC/AD converter 213 outputs the image signal to the image input controller 214 and outputs the focus detection signal to the focus detection signal processing unit 215.

The image input controller 214 stores the image signal, output from the CDS/AGC/AD converter 213, in the RAM 221. The display control unit 217 displays the image signal (image signal) stored in the RAM 221 on the display unit 218 via the bus 216. When the device is in a mode of recording the image signal, the recording medium control unit 219 records the signal in the recording medium 220. The ROM 222 as a recording medium connected via the bus 216 stores computer control programs and various types of data and the like required by the camera control unit 224 to execute processing illustrated in the flowcharts in FIG. 3 and FIG. 4. The flash ROM 223 stores various types of setting information related to an operation of the camera main body 21, such as user setting information, and the like. Various types of calculations and control according to the present exemplary embodiment are implemented by firmware. Alternatively, the calculations and control may be implemented by a dedicated electrical circuit as hardware.

The focus detection signal processing unit 215 performs correlation calculation, based on the two (pair of) focus detection image signals output from the CDS/AGC/AD converter 213, to obtain the image shift amount and reliability information (a level of similarity, steepness of two images, and the like). The focus detection signal processing unit 215 outputs the image shift amount and the reliability information thus obtained to the camera control unit 224. Based on the obtained image shift amount and reliability information, the camera control unit 224 notifies the focus detection signal processing unit 215 of a change in setting for calculating these values. For example, an area as a target of the correlation calculation may be widened when the image shift amount is large, or the type of a bandpass filter may be changed in accordance with contrast information. Focus detection signal processing according to the present exemplary embodiment is described below in detail with reference to FIG. 4 and FIGS. 5A, 5B, and 5C. A signal processing device according to the present exemplary embodiment at least includes the focus detection signal processing unit 215 and the camera control unit 224 described later.

In the present exemplary embodiment, a total of three signals, including the image signal and the two (pair of) focus detection image signals, are acquired from the image sensor 212. However, this should not be construed in a limiting sense. For example, a total of two signals, including the image signal and a single focus detection image signal, may be acquired to achieve a lower processing load on the image sensor 212. In such a configuration, another focus detection signal may be generated based on a difference between the image signal and the focus detection signal.

The camera control unit 224 transmits and receives information to and from the entire configuration in the camera main body 21 to perform the control. The control covers not only the processing inside the camera main body 21, but also covers various camera functions implemented in accordance with an operation by a user input through the camera operation unit 227, such as turning ON/OFF the power, release button related operations, setting change, recording start, and recorded image displaying. The release button is connected with a release switch SW1 and a release switch SW2, respectively turned ON by a first stroke operation (half-pressing operation) and a second strode operation (full-pressing operation) performed by the user. The above-described transmission and reception of the information to and from the lens control unit 206 in the lens 20 include transmitting a control command and control information to the lens and acquiring lens control information (optical information) in the lens.

[Issue Assumed to be Resolved by the Present Exemplary Embodiment]

An issue assumed to be resolved by the present exemplary embodiment is described before processing executed by the image capturing apparatus is described. There has been an issue that when conventional phase-difference detection methods detect an image shift amount to detect an in-focus position for a periodic pattern such as stripes in a largely out-of-focus state, the conventional methods erroneously detect an image shift amount not corresponding to the in-focus position detected as the image shift amount corresponding to the in-focus position. The reason why the issue arises is described below.

A large defocusing leads to a massive blurring of the periodic pattern, involving a higher chance of blurred objects overlapping with each other. An overlapped portion of the blurred objects has a high luminance level, resulting in the image sensor 212 acquiring an image signal corresponding to an image with an object appearing at a position, in the periodic pattern, actually including no object. This phenomenon of generating an image signal corresponding to an image with an object appearing at a position, in the periodic pattern, actually including no object, due to the overlapping between the blurred objects, is referred to as spurious resolution. The focus lens 203, driven in accordance with a defocus amount obtained with an image shift amount detected based on the image signals acquired with an image involving the spurious resolution, is moved to a position not corresponding to the in-focus position.

The imaging plane phase-difference detection method is more susceptible to the spurious resolution resulting in the false focusing, compared with other types of phase-difference detection methods, for the reason described below. The pupil areas in the imaging plane phase-difference detection method are less likely to be clearly divided due to an influence of diffraction. Furthermore, the pupil areas in the imaging plane phase-difference detection method involve vignetting due to a frame of the imaging lens or the diaphragm that might compromise isomorphism between the pair of image signals. As described above, the imaging plane phase-difference detection method involves blurring and image collapsing resulting in severe spurious resolution, and thus is plagued by a higher risk of false focusing compared with the other phase-difference detection methods.

In view of the above, the present exemplary embodiment features a configuration described below that can determine whether false focusing on the periodic pattern occurs even in the out-of-focus state, so that the false focusing can be prevented even in the out-of-focus state.

[Processing Executed by Image Capturing Apparatus (FIG. 3)]

Next, processing executed by the image capturing apparatus according to the present exemplary embodiment illustrated in FIG. 1 is described with reference to FIG. 3.

Figure 3:
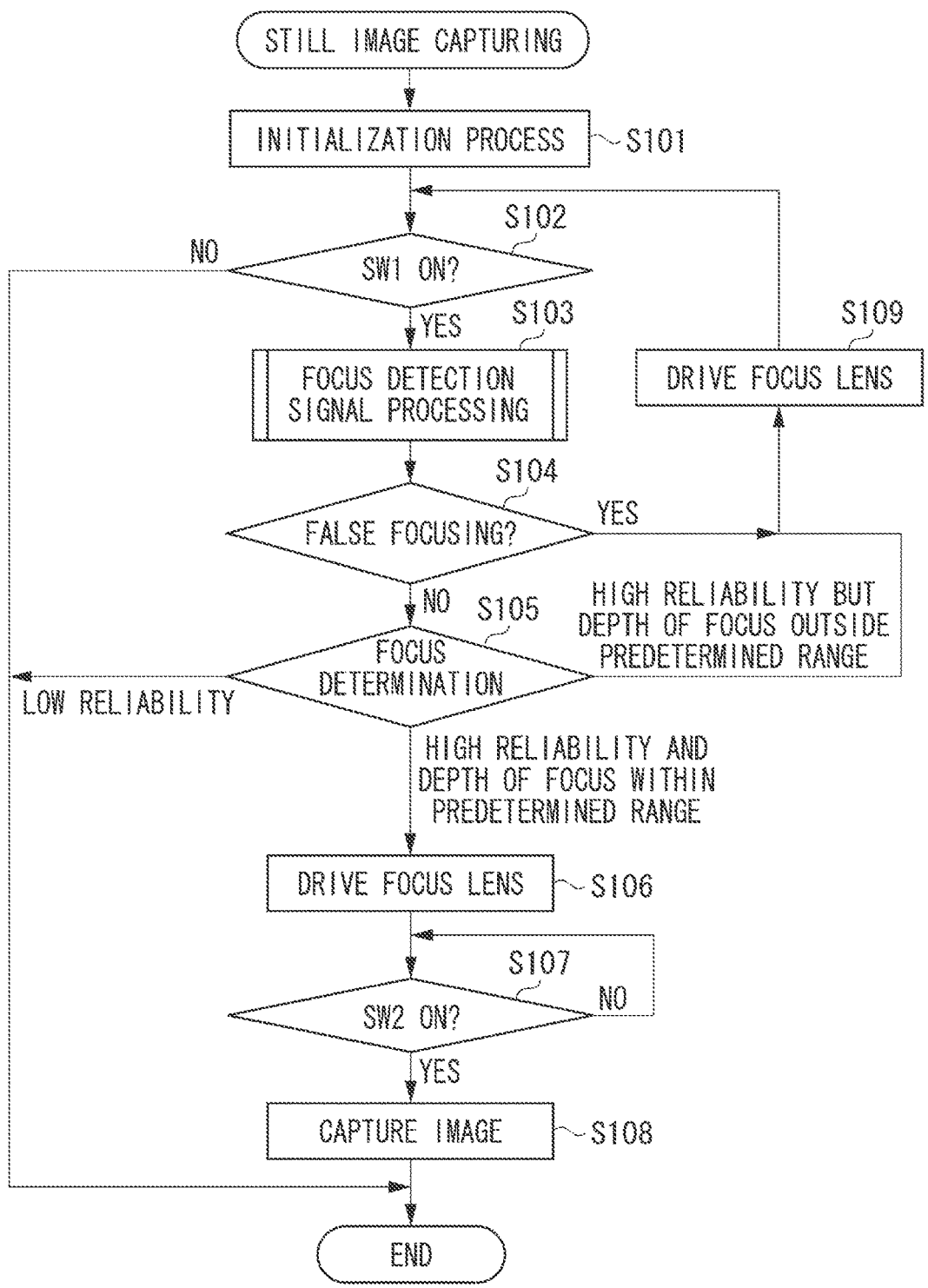
FIG. 3 is a flowchart illustrating processing executed by an embodiment of the image capturing apparatus.

FIG. 3 is a flowchart illustrating a procedure of processing executed by the image capturing apparatus for capturing a still image. In step S101, the camera control unit 224 performs control so that a camera initialization process is performed, and the processing proceeds to step S102. In the initialization process, various types of setting information related to operations of the camera main body 21, such as user setting information, stored in the flash ROM 223 is read. Also, the lens control information (optical information) is acquired via communication with the lens 20.

In step S102, the camera control unit 224 performs control so that, if the release switch SW1 of the release button of the camera operation unit 227 is ON (YES in step S102), the processing proceeds to step S103. If the release switch SW1 is OFF (NO in step S102), the still image capturing of this flow is terminated.

Figure 4:
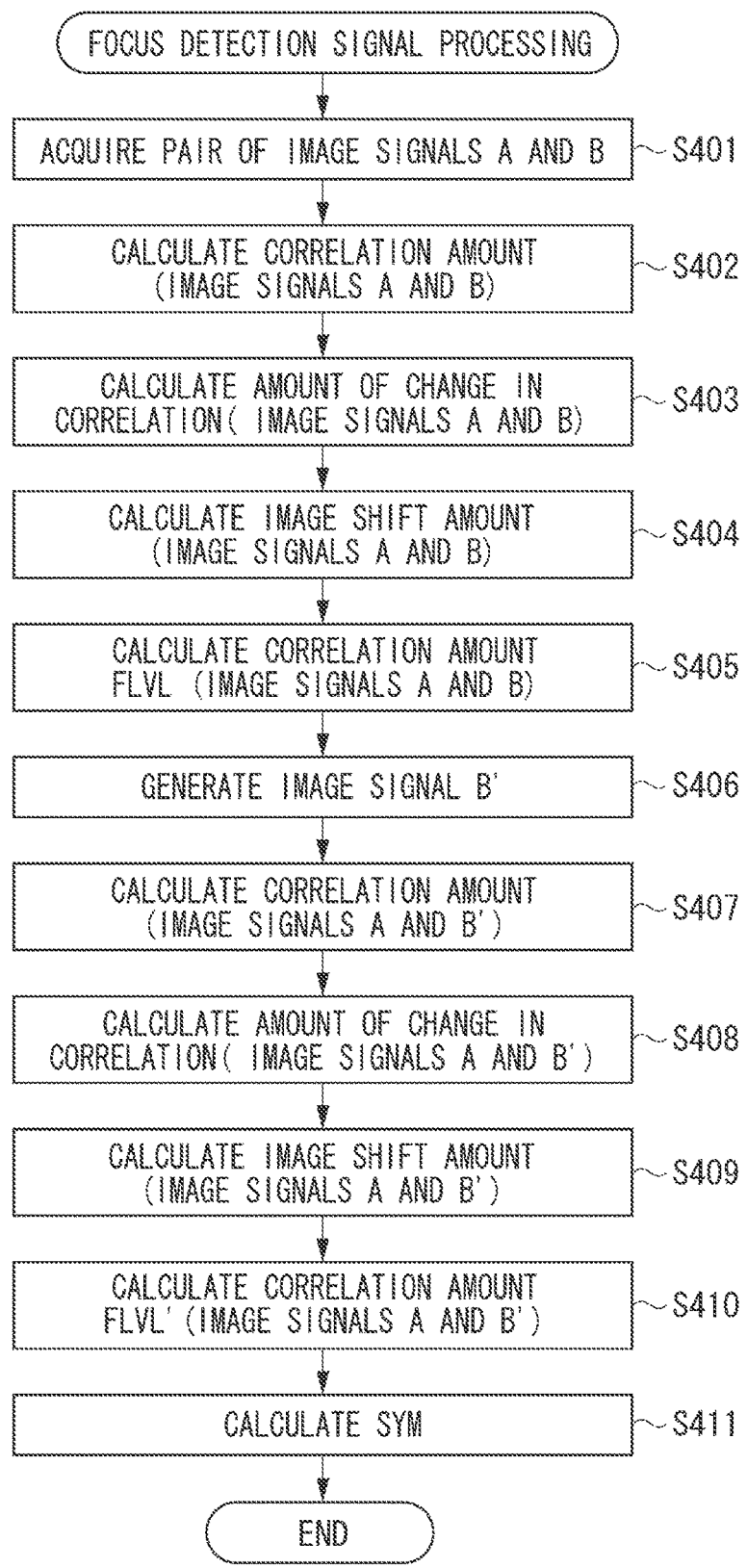
FIG. 4 is a flowchart illustrating focus detection signal processing.

In step S103, focus detection signal processing is executed. In the focus detection signal processing, the focus detection signal processing unit 215 performs correlation calculation based on the two (pair of) focus detection image signals output from the image sensor 212 to obtain the image shift amount and the reliability information (level of similarity of the two images, and steepness of the two images). Further, SYM is calculated based on correlation amounts FLVL and FLVL' described below. The focus detection signal processing will be described in detail below with reference to FIG. 4 illustrating a sub flow. Herein, the correlation amount is a value as an index indicating a level of similarity of a pair of image signals (an image signal A and an image signal B). In the present exemplary embodiment, the camera control unit 224 determines that two images with a smaller correlation amount that is based on the difference between the two images have a higher level of similarity. The correlation amounts FLVL and FLVL' are smallest correlation amounts of the two images, i.e., correlation amounts in a case where the two images are determined to be similar, as will be described in detail below.

In step S104, the camera control unit 224 (determination unit) determines whether the false focusing occurs with the image shift amount calculated in step S103 by the focus detection signal processing unit 215, based on the SYM calculated in step S103 by the focus detection signal processing unit 215. When the SYM is smaller than a first predetermined value as a threshold (YES in step S104), the camera control unit 224 determines that the false focusing occurs with the image shift amount calculated in step S103, and that the image shift amount calculated in step S103 cannot be used. Then, the processing proceeds to step S109. When the SYM described below is equal to or larger than the first predetermined value as the threshold (NO in step S104), the camera control unit 224 determines that the false focusing does not occur with the image shift amount calculated in step S103, and the processing proceeds to step S105. In this way, in the present exemplary embodiment, the camera control unit 224 outputs different signals so that different types of processes are executed between the case where the camera control unit 224 determines that the false focusing occurs in step S103 and the case where the camera control unit 224 determines that the false focusing does not occur in step S103.

In step S105, the camera control unit 224 obtains a defocus amount based on the image shift amount calculated in step S103. Then, the camera control unit 224 performs focus determination based on the defocus amount, and the level of similarity of the two images (based on the correlation amount FLVL) and the steepness of the two images as the reliability information.

If the level of similarity of the two images or the steepness of the two images, as the reliability information, is low, i.e., the reliability is low (LOW RELIABILITY in step S105), the camera control unit 224 determines that the focusing cannot be achieved for the subject, and terminates the still image capturing. Meanwhile, if the reliability is high but calculation of a focus position to be achieved when the focus lens is driven based on the defocus amount results in a depth of focus outside a predetermined range (HIGH RELIABILITY BUT DEPTH OF FOCUS OUTSIDE PREDETERMINED RANGE in step S105), the camera control unit 224 determines that the focusing cannot be achieved, and the processing proceeds to step S109. When neither of these conditions applies (HIGH RELIABILITY AND DEPTH OF FOCUS WITHIN PREDETERMINED RANGE in step S105), the camera control unit 224 determines that the focusing can be achieved, and the processing proceeds to step S106.

In step S106, the camera control unit 224 (drive control unit) calculates a driving amount of the focus lens 203 based on the defocus amount used in step S104, and transmits a drive command for the focus lens 203 to the lens control unit 206. The lens control unit 206 drives the focus lens 203 via the focus control unit 205 in accordance with the drive command received from the camera control unit 224 to adjust focusing on the image sensor 212.

In step S107, the camera control unit 224 performs control so that, if the release switch SW2 of the release button of the camera operation unit 227 is ON (YES in step S107), the processing proceeds to step S108. If the release switch SW2 is OFF (NO in step S107), step S107 is repeated. In step S108, an image is captured.

In step S109, the camera control unit 224 controls driving of the focus lens 203. When the camera control unit 224 determines that the false focusing occurs in step S104 (YES in step S104), the focus detection signal processing unit 215 (direction detection unit) detects a driving direction of the focus lens 203 based on the image shift amount detected by the focus detection signal processing unit 215 in step S103. Then, the camera control unit 224 performs control in such a manner that search driving is performed based on the driving direction. In the search driving, the focus lens 203 is driven by a predetermined amount in the driving direction until a predetermined condition is satisfied, regardless of the image shift amount detected by the focus detection signal processing unit 215 in step S103. In the present exemplary embodiment, steps S109 and S103 are repeated while the search driving is continuously performed, until the camera control unit 224 determines that no false focusing occurs in step S104. When the depth of focus is determined to be outside the predetermined range in step S105, the camera control unit 224 calculates the driving amount of the focus lens 203 based on the image shift amount detected by the focus detection signal processing unit 215 in step S103. Then, the camera control unit 224 transmits a driving command of the focus lens 203 to the lens control unit 206. The lens control unit 206 drives the focus lens 203 via the focus control unit 205 in accordance with the drive command received from the camera control unit 224 to adjust focusing on the image sensor 212.

[Focus Detection Signal Processing]

Next, the focus detection signal processing in step S103 is described with reference to FIG. 4 and FIGS. 5A, 5B, and 5C. As described above, FIG. 4 is a flowchart as a sub flow illustrating the focus detection signal processing (step S103).

First of all, in step S401, the pair of image signals, that is, the image signal A and the image signal B, are acquired respectively from the pair of photodiodes PD in a certain area on the image sensor 212.

[Calculation of Correlation Amount of Image Signal A and Image Signal B (Steps S401 to S405)]

Figure 5A:
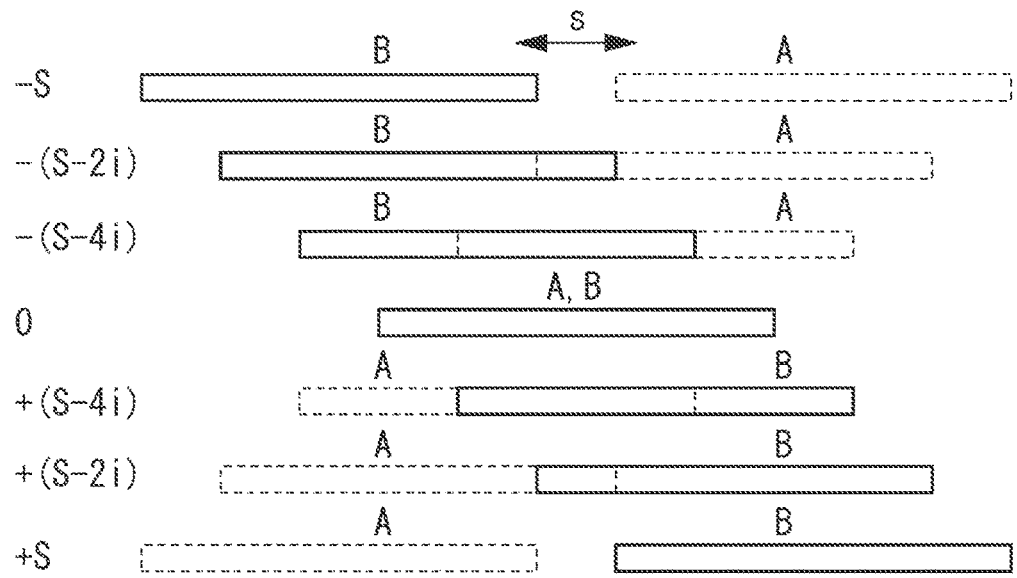
FIGS. 5A, 5B, and 5C are a diagram and graphs each illustrating an embodiment of the focus detection signal processing.

Next, in step S402, the focus detection signal processing unit 215 calculates the correlation amount of the image signal A and the image signal B as the pair of image signals acquired in step S401. FIG. 5A is a schematic view illustrating how the correlation amount is calculated. In FIG. 5A, the image signal A and the image signal B are shifted by one bit at a time from −S to +S, and i represents a shift amount at a time and S represents the maximum shift amount. Furthermore, in FIG. 5A, −S, −(S−2i), −(S−4i), 0, +(S−4i), +(S−2i), and +S represent shift positions as a result of shifting the image signal A and the image signal B one bit at a time. As described above, the correlation amount is a value serving as an index indicating the level of similarity between the image signal A and the image signal B. A correlation amount COR corresponding to each shift position is calculated as a sum total of absolute values of the differences between the image signal A and the image signal B. Thus, in the present exemplary embodiment, a smaller correlation amount relates to a higher correlation between the image signal A and the image signal B, that is, a higher degree of similarity between the image signal A and the image signal B. The correlation amount, as the sum total of absolute values of the differences between the image signal A and the image signal B, can be calculated with the following Formula (1) where i represents the shift amount of shifting the signals one bit at a time, k represents a pixel number, and M represents the number of pixels.

[Math. 1]

$$COR[i] = \sum_{k=0}^{M} |A[k+i] - B[k-i]| \qquad (1)$$

Figure 5B:
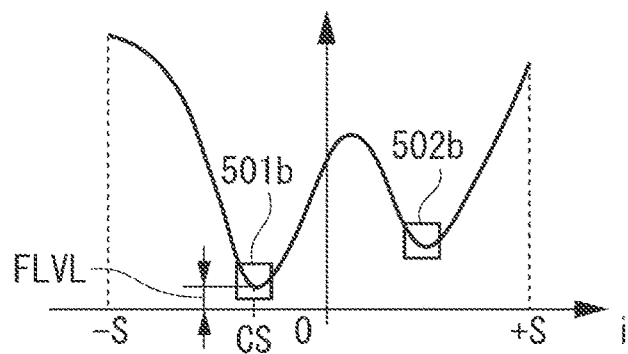

FIG. 5B is a graph illustrating a waveform of the correlation amount COR. In the graph, the horizontal axis represents the shift amounts, and the vertical axis represents the correlation amounts. Regions 501b and 502b each represent a region around an extreme value on the waveform of the correlation amount.

Next, in step S403, an amount of change in correlation ΔCOR is calculated based on the correlation amount calculated in step S402 in a manner described below. To calculate the extreme value of the correlation amount in FIG. 5B, an amount of change in correlation ΔCOR[i] between one correlation amount COR[i] and a correlation amount COR[i+2] as a result of shifting by two bits can be calculated with the following Formula (2) where i represents the shift amount.

[Math. 2]

$$\Delta COR[i] = COR[i] - COR[i+2] \qquad (2)$$

Figure 5C:
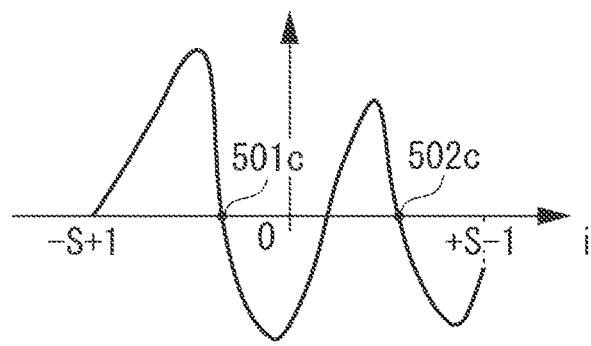

FIG. 5C is a graph illustrating a waveform of the amount of change in correlation ΔCOR. In the graph, the horizontal axis illustrates the shift amounts, and the vertical axis represents the amount of change in correlations. In FIG. 5C, shift positions 501c and 502c correspond to the extreme values of the correlation amount. Intersection between the waveform of the amount of change in correlation ΔCOR and a position where a value in the vertical axis is zero is referred to as zero cross. The correlation between the image signal A and the image signal B is high at a shift position involving the zero cross.

Next, in step S404, the focus detection signal processing unit 215 (image shift amount detection unit) detects the image shift amount of the image signal A and the image signal B based on the amount of change in correlation calculated in step S403. How the image shift amount is detected is described below. The image shift amount corresponds to the shift position with the highest correlation between the image signal A and the image signal B (smallest correlation amount), and thus can be obtained by detecting one of the shift positions involving the zero cross with the largest amount of change in correlation. In FIG. 5C, when the shift position 501c is one of the shift positions 501c and 502c, involving the zero cross, with a larger amount of change in correlation, a shift position cs illustrated in FIG. 5B is detected as the image shift amount.

Next, in step S405, the focus detection signal processing unit 215 (correlation amount calculation unit) calculates the correlation amount FLVL (first correlation amount) of the image signal A and the image signal B based on the amount of change in correlation calculated in step S403. How the correlation amount FLVL is calculated is described below. The correlation amount FLVL is a correlation amount as a result of shifting the image signal A and the image signal B by the image shift amount detected in step S404 (here, the shift position cs). For example, the correlation amount FLVL corresponding to the shift position cs is illustrated in FIG. 5B. In the present exemplary embodiment, the correlation amount FLVL is used as an index indicating the level of similarity between two images at the shift position with the smallest correlation amount. The correlation amount FLVL can be obtained by solving Formula (1) with COR[cs]. It is to be noted that an index other than the correlation amount used in the present exemplary embodiment may be used to indicate the degree of similarity between the image signal A and the image signal B.

The focus lens 203 is driven based on a driving amount converted from the defocus amount that is converted from the image shift amount detected in step S404, whereby the focusing on the image sensor 212 can be adjusted. In the present exemplary embodiment, the processing in steps S402 to S405 are executed with the pair of image signals as described above. Then, processing in steps S407 to S410 is executed in the same manner as the processing in steps S402 to S405, with one of the pair of image signals inverted in a left and right direction in step S406. The processing in step S406 and after is described below.

[Calculation of Correlation Amount with One of Pair of Image Signals Inversed in a Left and Right Direction (Steps S406 to S410)]

In steps S406 to S410, the focus detection signal processing unit 215 (correlation amount calculation unit) calculates the correlation amount FLVL' (second correlation amount) with one of the pair of image signals inversed in the left and right direction. When the false focusing on the periodic pattern occurs due to the spurious resolution, the correlation amount (correlation amount FLVL') obtained with one of the pair of image signals inversed in the left and right direction is small. Thus, the correlation amount FLVL' calculated is used for calculating the SYM (step S411) used for the false focusing determination, as will be described in detail below.

In step S406, the focus detection signal processing unit 215 (signal inverting unit) generates the image signal as a result of inverting one of the pair of image signals, acquired in step S401, in the left and right direction. In the present exemplary embodiment, an example is described where the image signal A and the image signal B are shifted left and right and thus the image shift amount in a left and right direction is calculated. Thus, the focus detection signal processing unit 215 inverts the signal in the left and right direction. Thus, the focus detection signal processing unit 215 inverts one of the pair of image signals in a direction in which the image shift amount is detected. In the description below, an image signal B' is generated by inverting the image signal B in the left and right direction. Alternatively, an image signal A' may be generated by inverting the image signal A in the left and right direction. The image signal obtained by the inversion in the left and right direction can be generated with the following Formula (3) where k represents the pixel number, and N represents the number of pixels.

[Math. 3]

$$B'[k]=B[N-k] \ (k=0,1,\ldots,N) \quad (3)$$

In step S407, the focus detection signal processing unit 215 calculates the correlation amount of the image signal A and the image signal B' as the pair of image signals. This correlation amount may be calculated in a manner that is the same as that in a case where the correlation amount of the image signal A and the image signal B is calculated in step S402.

In step S408, the focus detection signal processing unit 215 calculates the amount of change in correlation based on the correlation amount calculated in step S407. This amount of change in correlation may be calculated in a manner that is the same as that in a case where the amount of change in correlation of the image signal A and the image signal B is calculated in step S403.

In step S409, the focus detection signal processing unit 215 (image shift amount detection unit) detects the image shift amount of the image signal A and the image signal B' based on the amount of change in correlation calculated in step S408. This image shift amount may be detected in a manner that is the same as that in a case where the image shift amount of the image signal A and the image signal B is detected in step S404.

In step S410, the focus detection signal processing unit 215 (correlation amount calculation unit) calculates the correlation amount FLVL' of the image signal A and the image signal B' based on the amount of change in correlation calculated in step S409. The correlation amount FLVL' is a correlation amount of the image signal A and the image signal B' as a result of shifting the image signal A and the image signal B' by the image shift amount detected in step S404. This correlation amount FLVL' may be calculated in a manner that is the same as that in a case where the correlation amount of the image signal A and the image signal B is calculated in step S405.

The processing in step S405 is not limited to that described above, as long as the correlation amount FLVL can be calculated for comparing the two image signals in a time axis direction (in a direction in which signals are read from the pixel sections of the image sensor). Similarly, the processing in step S410 is not limited to that described above, as long as the correlation amount FLVL' can be obtained for comparing one of the two image signals in one direction on a time axis and the other one of the two image signals in the opposite direction on the time axis, that is, for comparing the two signals in the opposite directions on the time axis.

[Calculation of SYM]

Next, in step S411, the SYM is calculated. The SYM is a value of a ratio of the correlation amount FLVL' of the image signal A and the image signal B' to the correlation amount FLVL of the image signal A and the image signal B, and is an index indicating degradation of the isomorphism between the pair of image signal A and image signal B. The SYM is calculated with the following Formula (4).

[Math. 4]

$$SYM = \frac{FLVL'}{FLVL} \quad (4)$$

The SYM is described later with reference to FIG. 9.

When the processing in step S411 is terminated, the flow illustrated in FIG. 4 is terminated, and the processing proceeds to step S104 in FIG. 3.

The focus detection signal processing according to the present exemplary embodiment is described above. False focusing determination according to the present exemplary embodiment is described with reference to FIG. 6 to FIG. 9. In a case described in this example, the image shift amount is detected for a subject with which an image of a stripe pattern as illustrated in FIG. 7A is projected onto the imaging plane in an in-focus state.

[Reason Why One of Pair of Image Signals is Inverted]

As described above, in step S104 according to the present exemplary embodiment, the camera control unit 224 performs the false focusing determination based on the SYM calculated in step S411 and the first predetermined value as the threshold. A tendency of the SYM relative to the focus positions and the threshold based on the tendency are described below with two focus positions as examples.

Figure 6:
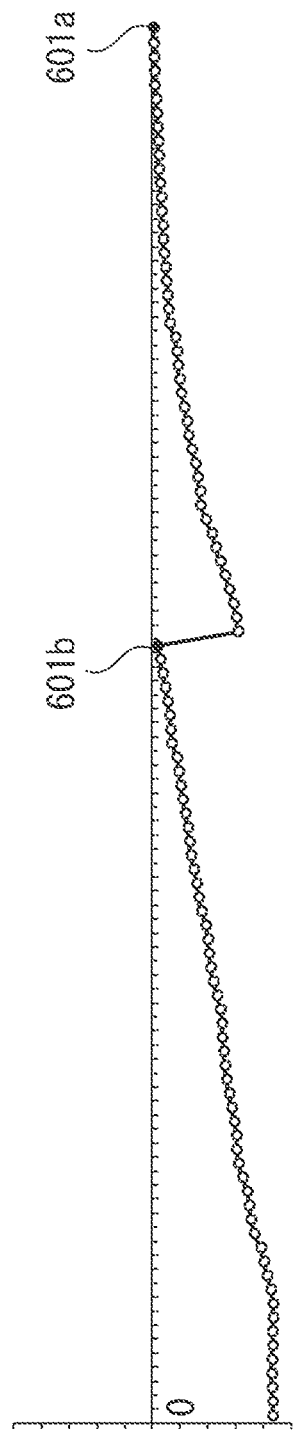
FIG. 6 is a diagram illustrating image shift amounts corresponding to focus positions.
Figure 7A:
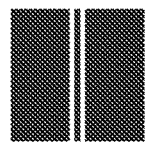
FIGS. 7A, 7B, 7C, 7D, and 7E are a diagram and graphs illustrating image signals of a subject and correlation amounts obtained with one focus position.

FIG. 6 illustrates image shift amounts at focus positions ranging from that corresponding to a largely out-of-focus state to that corresponding to an in-focus state, for a subject with which an image of the stripe pattern as illustrated in FIG. 7A is projected onto the imaging plane in the in-focus state. The horizontal axis represents the focus positions with a focus position at zero in the horizontal axis (at the left end) corresponding to the largely out-of-focus state. A focus position more on the right side is closer to that corresponding to the in-focus position. The vertical axis represents the image shift amounts, with an image shift amount closer to zero (position of the horizontal axis) indicating the detection of a smaller image shift amount.

As illustrated in FIG. 6, focus positions 601a and 601b each correspond to the image shift amount of zero detected by the focus detection signal processing unit 215. The focus position 601a corresponds to an in-focus position. The focus position 601b corresponds to the image shift amount of zero obtained for an image formed with the spurious resolution, and results in the false focusing. With the focus positions between the focus position 601b and the focus position at zero, the focus detection signal processing unit 215 detects the image shift amount corresponding to the focus position 601b. With focus positions closer to the focus position 601a than the focus position 601b, the focus detection signal processing unit 215 detects the image shift amount corresponding to the focus position 601a, that is, corresponding to the in-focus position.

FIGS. 7A, 7B, 7C, 7D, and 7E and FIGS. 8A, 8B, 8C, 8D, and 8E are diagrams and graphs illustrating image signals acquired with the focus positions 601a and 601b, respectively, as well as correlation amounts calculated with the pair of image signals.

Figure 7B:
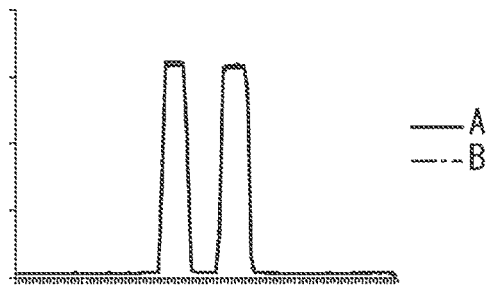
Figure 7C:
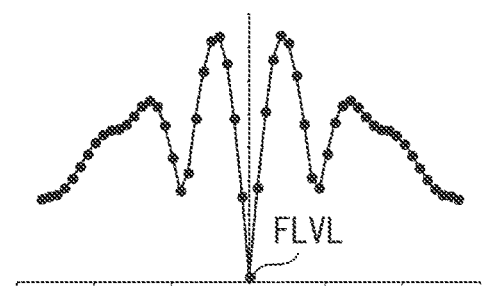

FIG. 7B illustrates the image signal A and the image signal B as the pair of image signal acquired with the focus position 601a in FIG. 6. The focus position 601a corresponds to the in-focus position. Thus, with the position, the periodic pattern involves no blurring or image collapsing, and the image signal A and the image signal B are substantially similar. In FIG. 7C, the vertical axis represents the correlation amounts, with a point closer to the horizontal axis corresponding to a smaller correlation amount, and the horizontal axis represents the shift amounts. As described above, the image signal A and the image signal B are substantially similar in FIG. 7B. A higher level or similarity between the pair of image signals results in a smaller correlation amount. Thus, in FIG. 7C the smallest value of the correlation amount is substantially on the horizontal axis.

Figure 7D:
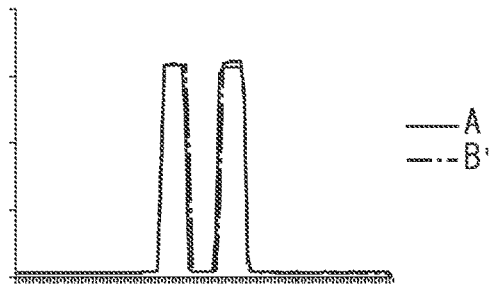
Figure 7E:
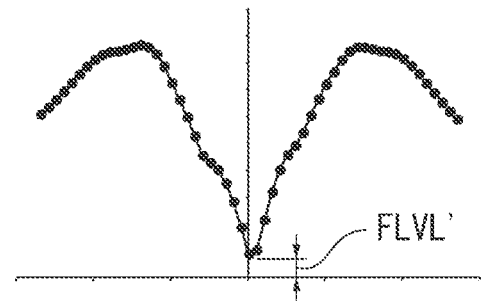

FIG. 7D is a graph with the image signal A overlapped with the image signal B' obtained by inverting the image signal B in the left and right direction. In FIG. 7D, as a result of inverting one of the pair of image signals substantially similar in FIG. 7B, the pair of image signals is not as similar as in FIG. 7B. A higher level of similarity of the pair of image signals results in a smaller correlation amount. Thus, the smallest value (correlation amount FLVL') of the correlation amount of the image signal A and the image signal B' illustrated in FIG. 7E is larger than the smallest value (correlation amount FLVL) of the correlation amount of the image signal A and the image signal B illustrated in FIG. 7C.

Figure 8A:
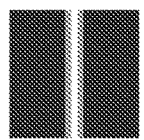
FIGS. 8A, 8B, 8C, 8D, and 8E are a diagram and graphs illustrating image signals of a subject and correlation amounts obtained with another focus position.
Figure 8B:
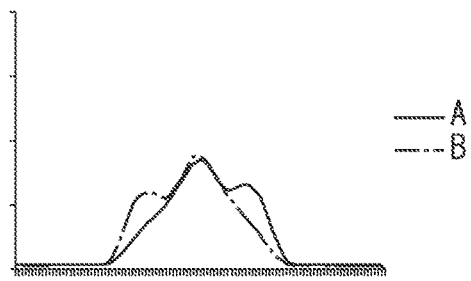
Figure 8C:
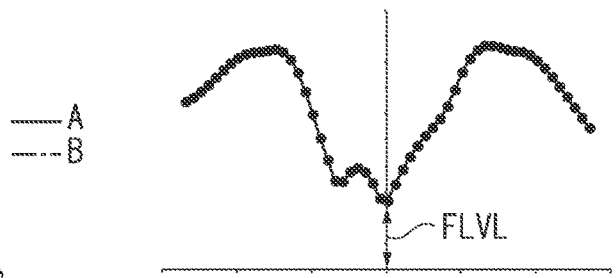

FIG. 8B illustrates the image signal A and the image signal B as the pair of image signals acquired with the focus position 601b in FIG. 6. The focus position 601b corresponds to the image shift amount of zero obtained with an image formed with the spurious resolution. The image with the spurious resolution is collapsed. FIG. 8A illustrates the resultant image projected on the imaging plane. The image illustrated in FIG. 8A has a portion where two lines, also illustrated in FIG. 7A, blurred to overlap with each other. The overlapped portion has a high correlation. Thus, the image sensor 212 generates an image signal corresponding to the image with an object at the center between the two lines. As illustrated in FIG. 8B, the image signal A has no protruding form on the left side, and the image signal B has no protruding form on the right side, as a result of the image collapsing due to the blurring. Thus, the isomorphism between the image signal A and the image signal B is compromised.

In this manner, with the focus position 601b, a false image shift amount is detected with the blur overlapped portion detected as the portion with the highest correlation due to the spurious resolution and the image collapsing.

Figure 8D:
Figure 8E:
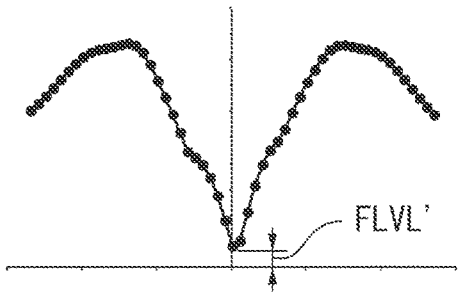

On the other hand, FIG. 8D illustrates signals overlapped with each other after inverting the image signal B, as one of the image signal A and the image signal B involving the spurious resolution and the accompanying image collapsing. As illustrated in the figure, the pair of image signals is more similar than the image signal A and the image signal B overlapped with each other as illustrated in FIG. 8B. A higher level of similarity of the pair of image signals results in a smaller correlation amount. Thus, the smallest value (correlation amount FLVL') of the correlation amount of the image signal A and the image signal B' illustrated in FIG. 8E is smaller than the smallest value (correlation amount FLVL) of the correlation amount of the image signal A and the image signal B illustrated in FIG. 8C.

As described above, with the focus position resulting in the false focusing, a smaller correlation amount FLVL', calculated with one of the pair of image signals inverted, is obtained compared with the correlation amount FLVL, calculated without inverting any one of the pair of image signals.

[Tendency of SYM Relative to Focus Positions]

The tendency of the SYM relative to focus positions including the focus positions 601a and 601b (901a and 901b, respectively) are described with reference to FIG. 9.

Figure 9:
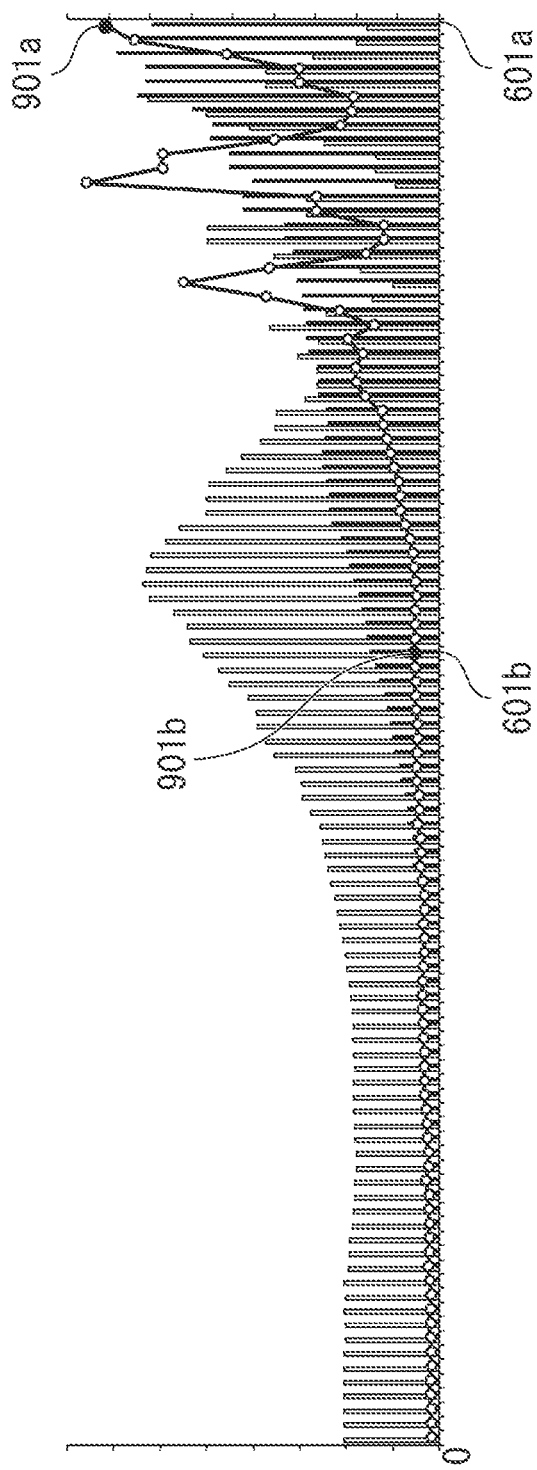
FIG. 9 is a graph illustrating a tendency of SYM relative to focus positions.

Referring to FIG. 9, the horizontal axis represents the focus positions with a focus position at zero in the horizontal axis (at the left end) corresponding to the largely out-of-focus state. A focus position more on the right side is closer to that corresponding to the in-focus position. Any position between the focus position 601b and the focus position at zero results in the false focusing due to spurious resolution. On the other hand, with any focus position closer to the focus position 601a than the focus position 601b, the focus detection signal processing unit 215 can detect the image shift amount with which the focusing can be achieved.

Referring to FIG. 9, white bars each represent a correlation amount (first correlation amount) of the image signal A and the image signal B at corresponding one of the focus positions. As described above, the correlation amount FLVL is a correlation amount obtained by shifting the image signal A and the image signal B by the image shift amount detected in step S404.

Referring to FIG. 9, black bars each represent a correlation amount (second correlation amount) of the image signal A and the image signal B' at corresponding one of the focus positions. As described above, the correlation amount FLVL' is a correlation amount obtained by shifting the image signal A and the image signal B' by the image shift amount detected in step S404.

Referring to FIG. 9, a line graph represents the SYM (FLVL'/FLVL) as values obtained by dividing the correlation amount (second correlation amount) of the image signal A and the image signal B' by the correlation amount (first correlation amount) of the image signal A and the image signal B. A larger value on the line graph is obtained with a larger correlation amount FLVL' when the correlation amount FLVL is fixed or with a larger correlation amount FLVL' when the correlation amount FLVL is fixed.

How the value on the line graph illustrated in FIG. 9 changes among the focus positions is described. The SYM, as the value on the curve, tends to increase toward the right from the position at zero (left end) on the horizontal axis for the reason described below. More specifically, with a focus position corresponding to the largely out-of-focus state involving the spurious resolution, a small correlation amount FLVL' is obtained. With a focus position closer to that corresponding to the in-focus position, a larger correlation amount FLVL' is obtained. On the other hand, the correlation amount FLVL increases up to the focus position 601*b* together with the correlation amount FLVL', while being larger than the correlation amount FLVL'. Then, the correlation amount FLVL generally decrease from the focus position 601*b* toward the focus position corresponding to the in-focus position. Thus, the value of the SYM, as the value on the line graph, tends to increase toward the right from the position at zero (left end) of the horizontal axis.

[False Focusing Determination]

As described above, the focus positions can be classified into those resulting in false focusing and those achieving the focusing, with reference to the focus position 601*b*. The SYM tends to change among the focus position in such a manner as to increase from the focus position at zero toward the focus position corresponding to the in-focus state. The false focusing in step S104 is performed based on these characteristics. More specifically, the camera control unit 224 performs the false focusing determination by comparing the SYM with the first predetermined value as the threshold set to be larger than the value of the SYM corresponding to the focus position 601*b*.

In the present exemplary embodiment, when the value of the SYM is equal to or larger than the first predetermined value, the image shift amount detected in step S404 corresponds to the in-focus position, and thus the camera control unit 224 determines that the focusing can be achieved with the image shift amount. On the other hand, when the value of the SYM is smaller than the first predetermined value, the image shift amount detected from the image signal A and the image signal B used for calculating the correlation amount FLVL does not correspond to the in-focus position, and thus the camera control unit 224 determines that the image shift amount results in the false focusing.

[Effect of the Present Exemplary Embodiment]

As described above, in the present exemplary embodiment, whether the image shift amount detected in step S403 corresponds to the in-focus position is determined based on the correlation amount FLVL and the correlation amount FLVL'.

Thus, whether the false focusing on the periodic pattern occurs can be determined, even in a largely out-of-focus state.

[Modification of False Focusing Determination]

In the present exemplary embodiment, whether the false focusing on the periodic pattern occurs is determined by using the SYM. Alternatively, the determination may be made based on increase/decrease of the correlation amounts FLVL and FLVL'. For example, when a value equal to or larger than a second predetermined value is obtained as a result of subtracting the correlation amount FLVL' from the correlation amount FLVL, the camera control unit 224 determines that a false image shift amount resulting in the false focusing is detected. When the value is smaller than the second predetermined value, the image shift amount detected in step S404 corresponds to the in-focus state, whereby the camera control unit 224 determines that the focusing can be achieved with the image shift amount.

Thresholds may be set in such a manner that the camera control unit 224 determines that the false focusing occurs when the correlation amount FLVL is equal to or larger than a third predetermined value and the correlation amount FLVL' is smaller than a fourth predetermined value. This means that the camera control unit 224 determines that the focusing can be achieved with the image shift amount detected in step S404, when the first correlation amount is smaller than the third predetermined value and the second correlation amount is equal to or larger than the fourth predetermined value.

The black bars, corresponding to the correlation amounts FLVL' of the image signal A and the image signal B' generally rises toward the right in FIG. 9. Thus, the correlation amount FLVL' of the image signal A and the image signal B' tends to increase toward the position corresponding to the in-focus position. Thus, the camera control unit 224 may determine that the false focusing occurs when the correlation amount FLVL' is smaller than a fifth predetermined value, and that no false focusing occurs when the correlation amount FLVL' is equal to or larger than the fifth predetermined value.

Furthermore, whether the false focusing on the periodic pattern occurs may be simply determined based on which one of the correlation amounts FLVL and FLVL' is larger than the other. For example, the camera control unit 224 may determine that the false focusing occurs in step S104 when the correlation amount FLVL' is smaller than the correlation amount FLVL. Thus, the camera control unit 224 may determine that no false focusing occurs in step S104 when the correlation amount FLVL' is equal to or larger than the correlation amount FLVL. This is because any focus position closer to the focus position corresponding to the in-focus position than the focus position corresponding to the correlation amount FLVL' smaller correlation amount FLVL results in no false focusing. Thus, the focus position resulting in the false focusing is not detected as the focus position corresponding to the in-focus position in the configuration described above.

In the exemplary configuration capable of performing focus detection with the imaging plane phase-difference detection method described above, each pixel section includes two photodiodes PD. Embodiments of the present disclosure are not limited to this configuration, as long as signals can be output that respectively correspond to a pair of light beams each received after passing through a corresponding one of areas, in an exit pupil of an imaging optical system in an image sensor, at least partially different from each other. For example, the image sensor may include a plurality of image displaying or image recording pixel sections and a plurality of focus detection pixel sections. In this configuration, the focus detection pixel section may receive a light beam that has passed through a partial area in the exit pupil. For example, in one technique for such a configuration of the pixel section for focus detection, the focus detection pixel section may be provided with a light shielding layer (see, for example, Japanese Patent Application Laid-Open No. 2009-217252 ). For example, with the light-shielding layer, the image sensor 212 can have a first focus detection pixel section that receives a light beam that has passed through an area corresponding to the pupil area AP-a described above and second focus detection pixel section that receives a light beam that has passed through an area corresponding to the pupil are AP-b described above. Thus, the image sensor 212 can output the image signal A and the image signal B as in the exemplary embodiment described above. Also in this configuration, the area (first area) corresponding to the pupil area AP-a and the area (second area) corresponding to the pupil area AP-b are areas, in the exit pupil EP, at least partially different from each other.

In the processing according to the exemplary embodiment described above, the processing in steps S402 to S410 are always executed to calculate the SYM. Alternatively, the SYM may be calculated with the processing in steps S406 to S410 executed when the result of the determination in step S105 indicates that the focusing can be achieved.

In the exemplary embodiment described above, the correlation amount is calculated with Formula (1) described above. Thus, a smaller correlation amount is obtained with the pair of image signals more similar each other, compared with that obtained with the pair of image signals not similar each other. However, the correlation amount is merely an index indicating the level of similarity between the pair of signals at each shift position, and the method for calculating the correlation amount is not limited to this. For example, the correlation amount may be calculated with a different method in which a larger correlation amount is obtained with the pair of image signals more similar each other, compared with that obtained with the pair of image signals not similar each other. In such a case, for example, a threshold may be set as a value smaller than the value of SYM, obtained by FLVL/FLVL', corresponding to the focus position 601b. Thus, for example, the camera control unit 224 may determine that the false focusing occurs in step S104 when the SYM is larger than the threshold, and may determine that no false focusing occurs in step S104 when the SYM is smaller than the threshold. As described above, the same effect can be obtained with a method for calculating a correlation amount that is different from at least one embodiment of a method in the present disclosure in the relationship between the values, with an optimum threshold set in accordance with the relationship between the values.

A sophisticated method may be used to calculate the correlation amount of the two image signals so that the same effect as that obtained with one of the image signal A and the image signal B inverted can be obtained, without actually inverting the signal. For example, such calculation can be implemented with the following Formula 5 in which differences are sequentially calculated in a forward direction on the time axis for one of the image signals and calculated in a backward direction on the time axis for the other one of the image signals.

[Math. 5]

$$COR[i] = \sum_{k=0}^{M} |A[k+i] - B[M-(k-i)]| \quad (5)$$

In the present exemplary embodiment, the image signal A and the image signal B are acquired from the image sensor 212 in step S401, and the focus detection signal processing unit 215 executes the processing of inverting the image signal in the direction in which the image shift amount is detected in step S406. Alternatively, the image signal B may be read from the image sensor 212 in a direction opposite to that of the image signal A. Thus, the image signal B' can be obtained as in the case where the focus detection signal processing unit 215 inverts the signal. The camera control unit 224 controls the direction in which the signal charges accumulated in the photodiodes are read.

Exemplary embodiments of the present disclosure have been described above. The present invention is not limited to those exemplary embodiments, and can be varied and modified in various ways without departing from the gist of the present invention.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-140645, filed Jul. 15, 2016, which is hereby incorporated by reference herein in its entirety.

What is claimed is:

1. A signal processing device comprising:
a correlation amount calculation unit configured to calculate a first correlation amount obtained by comparing a pair of image signals with each other in a same direction on a time axis and a second correlation amount obtained by comparing the pair of image signals with each other in opposite directions on the time axis, the pair of image signals being output from an image sensor and respectively corresponding to a pair of light beams that have each passed through a corresponding one of areas, in an exit pupil of an imaging optical system, that are at least partially different from each other; and
a determination unit configured to determine whether an image shift amount corresponding to the first correlation amount corresponds to an in-focus position, based on the first correlation amount and the second correlation amount.

2. The signal processing device according to claim 1, wherein the determination unit is configured to determine that the image shift amount corresponding to the first correlation amount does not correspond to the in-focus position, in a case where the pair of image signals compared with each other in the opposite directions on the time axis exhibits a higher level of similarity of the pair of image signals than a level of similarity of the pair of image signals compared with each other in the same direction on the time axis.

3. The signal processing device according to claim 1, wherein the determination unit is configured to determine that the image shift amount corresponding to the first correlation amount does not correspond to the in-focus position, in a case where the second correlation amount is smaller than the first correlation amount.

4. The signal processing device according to claim 3, further comprising a driving control unit configured to control driving of a focus lens,
wherein the driving control unit is configured to control driving of the focus lens based on the image shift amount corresponding to the first correlation amount, in a case where the second correlation amount is equal to or larger than the first correlation amount.

5. The signal processing device according to claim 1, wherein the determination unit is configured to determine that the image shift amount corresponding to the first correlation amount does not correspond to the in-focus position, in a case where a ratio of the second correlation amount to the first correlation amount is smaller than a first predetermined value.

6. The signal processing device according to claim 5, further comprising a driving control unit configured to control driving of a focus lens,
wherein the driving control unit is configured to control driving of the focus lens based on the image shift amount corresponding to the first correlation amount, in a case where the ratio of the second correlation amount to the first correlation amount is equal to or larger than the first predetermined value.

7. The signal processing device according to claim 1, wherein the determination unit is configured to determine that the image shift amount corresponding to the first correlation amount does not correspond to the in-focus position, in a case where a difference between the first correlation amount and the second correlation amount is equal to or larger than a second predetermined value.

8. The signal processing device according to claim 7, further comprising a driving control unit configured to control driving of a focus lens,
wherein the driving control unit is configured to control driving of the focus lens based on the image shift amount corresponding to the first correlation amount, in a case where the difference between the first correlation amount and the second correlation amount is smaller than the second predetermined value.

9. The signal processing device according to claim 1, wherein the determination unit is configured to determine that the pair of image signals do not correspond to the in-focus position, in a case where the first correlation amount is equal to or larger than a third predetermined value and the second correlation amount is smaller than a fourth predetermined value.

10. The signal processing device according to claim 9, further comprising a driving control unit configured to control driving of a focus lens,
wherein the driving control unit is configured to control driving of the focus lens based on the image shift amount corresponding to the first correlation amount, in a case where the first correlation amount is smaller than the third predetermined value and the second correlation amount is equal to or larger than the fourth predetermined value.

11. The signal processing device according to claim 1, further comprising a driving control unit configured to control driving of a focus lens,
wherein the driving control unit is configured not to use the image shift amount to drive the focus lens, in a case where the determination unit has determined that the image shift amount corresponding to the first correlation amount does not correspond to the in-focus position.

12. The signal processing device according to claim 11, further comprising a direction detection unit configured to detect a driving direction of the focus lens based on the pair of image signals,
wherein the driving control unit is configured to control driving of the focus lens based on the driving direction detected by the direction detection unit, in a case where the determination unit has determined that the image shift amount corresponding to the first correlation amount does not correspond to the in-focus position.

13. The signal processing device according to claim 12, wherein the focus lens is continued to be driven in the driving direction detected by the direction detection unit until the determination unit determines that the image shift amount corresponding to the first correlation amount corresponds to the in-focus position.

14. The signal processing device according to claim 1, further comprising a signal inverting unit configured to invert one of the pair of image signals in a direction in which the image shift amount is detected,
wherein the correlation amount calculation unit is configured to calculate the second correlation amount by using an image signal, obtained by the signal inverting unit inverting the one of the pair of image signals, and another one of the pair of image signals.

15. The signal processing device according to claim 1, further comprising an image shift amount detection unit configured to detect an image shift amount based on the pair of image signals that is output from the image sensor and respectively corresponds to the pair of light beams having each passed through a corresponding one of the areas, in the exit pupil of the imaging optical system, that are at least partially different from each other.

16. The signal processing device according to claim 15, wherein the image sensor includes a plurality of pixel sections each including a pair of photoelectric conversion units that respectively receives the pair of light beams having each passed through a corresponding one of the areas, in the exit pupil of the imaging optical system, that are at least partially different from each other, via a single micro lens, and
wherein the image shift amount detection unit is configured to perform focus detection by using the pair of image signals acquired from the image sensor.

17. The signal processing device according to claim 15, wherein the image sensor includes a plurality of focus detection pixel sections that each includes a photoelectric conversion unit and acquires a signal for detecting a phase difference, and a plurality of recording pixel sections that each includes a photoelectric conversion unit and acquires a signal for recording,
wherein the focus detection pixel sections include a light-shielding layer and include a first focus detection pixel section including the light-shield layer so as to receive a light beam that has passed through a first pupil area that is a partial area of the exit pupil, and a second focus detection pixel section receiving a light beam that has passed through a second pupil area that is a partial area of the exit pupil and that is at least partially different from the first pupil area, and wherein the image shift amount detection unit is configured to perform focus detection by using a pair of image signals acquired from the focus detection pixel sections.

18. A method for controlling a signal processing device, the method comprising:

calculating a first correlation amount obtained by comparing a pair of image signals with each other in a same direction on a time axis and a second correlation amount obtained by comparing the pair of image signals with each other in opposite directions on the time axis, the pair of image signals being output from an image sensor and respectively corresponding to a pair of light beams that have each passed through a corresponding one of areas, in an exit pupil of an imaging optical system, that are at least partially different from each other; and determining whether an image shift amount corresponding to the first correlation amount corresponds to an in-focus position, based on the first correlation amount and the second correlation amount.

19. A signal processing device comprising:

a correlation amount calculation unit configured to calculate a second correlation amount obtained by comparing a pair of image signals with each other in opposite directions on a time axis, the pair of image signals being output from an image sensor and respectively corresponding to a pair of light beams that have each passed through a corresponding one of areas, in an exit pupil of an imaging optical system, that are at least partially different from each other; and a determination unit configured to determine whether an image shift amount based on the pair of image signals corresponds to an in-focus position, based on the second correlation amount, wherein the determination unit is configured to determine that the image shift amount based on the pair of image signals does not correspond to the in-focus position in a case where the second correlation amount is smaller than a predetermined value.

20. The signal processing device according to claim 19, further comprising a driving control unit configured to control driving of a focus lens, wherein the driving control unit is configured to control driving of the focus lens based on the image shift amount based on the pair of image signals, in a case where the second correlation amount is equal to or larger than the predetermined value.

21. A method for controlling a signal processing device, the method comprising:

calculating a second correlation amount obtained by comparing a pair of image signals with each other in opposite directions on a time axis, the pair of image signals being output from an image sensor and respectively corresponding to a pair of light beams that have each passed through a corresponding one of areas, in an exit pupil of an imaging optical system, that are at least partially different from each other; and determining whether an image shift amount based on the pair of image signals corresponds to an in-focus position, based on the second correlation amount, wherein, in the determining, it is determined that the image shift amount based on the pair of image signals does not correspond to the in-focus position in a case where the second correlation amount is smaller than a predetermined value.

22. A signal processing device comprising:

a correlation amount calculation unit configured to calculate a first correlation amount indicating a level of similarity of a pair of image signals and a second correlation amount indicating a level of similarity of the pair of image signals calculated with one of the pair of image signals inverted in a direction in which an image shift amount is detected, the pair of image signals being output from an image sensor and respectively corresponding to a pair of light beams that have each passed through a corresponding one of areas, in an exit pupil of an imaging optical system, that are at least partially different from each other, wherein different signals are output in accordance with a ratio of the second correlation amount to the first correlation amount.

23. The signal processing device according to claim 22, further comprising a driving control unit configured to control driving of a focus lens, wherein the driving control unit is configured to use the image shift amount corresponding to the first correlation amount to control the driving of the focus lens, in a case where the ratio of the second correlation amount to the first correlation amount is smaller than a first predetermined value, and wherein the driving control unit is configured not to use the image shift amount corresponding to the first correlation amount to control the driving of the focus lens, in a case where the ratio of the second correlation amount to the first correlation amount is equal to or larger than the first predetermined value.

24. A method for controlling a signal processing device, the method comprising:

calculating a first correlation amount indicating a level of similarity of a pair of image signals and a second correlation amount indicating a level of similarity of the pair of image signals calculated with one of the pair of image signals inverted in a direction in which an image shift amount is detected, the pair of image signals being output from an image sensor and respectively corresponding to a pair of light beams that have each passed through a corresponding one of areas, in an exit pupil of an imaging optical system, that are at least partially different from each other, wherein different signals are output in accordance with a ratio of the second correlation amount to the first correlation amount.

* * * * *